(12) United States Patent
Bao

(10) Patent No.: US 10,725,456 B2
(45) Date of Patent: Jul. 28, 2020

(54) NUMERICAL CONTROLLER

(71) Applicant: Fanuc Corporation, Minamitsuru-gun, Yamanashi (JP)

(72) Inventor: Chunyu Bao, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 35 days.

(21) Appl. No.: 16/225,744

(22) Filed: Dec. 19, 2018

(65) Prior Publication Data

US 2019/0196455 A1 Jun. 27, 2019

(30) Foreign Application Priority Data

Dec. 26, 2017 (JP) ................................ 2017-249268

(51) Int. Cl.
| | |
|---|---|
| *B23G 1/00* | (2006.01) |
| *B23G 1/32* | (2006.01) |
| *B23G 5/18* | (2006.01) |
| *G05B 19/02* | (2006.01) |
| *G05B 19/416* | (2006.01) |

(Continued)

(52) U.S. Cl.
CPC ....... *G05B 19/4163* (2013.01); *G05B 19/182* (2013.01); *B23G 1/00* (2013.01); *B23G 1/32* (2013.01); *B23G 5/18* (2013.01); *G05B 19/23* (2013.01); *G05B 2219/45215* (2013.01)

(58) Field of Classification Search
CPC ... B23G 1/00; B23G 1/32; B23G 5/18; G05B 19/4163; G05B 19/02
See application file for complete search history.

(56) References Cited

U.S. PATENT DOCUMENTS 3,728,823 A * 4/1973 Tomita ..................... B23G 1/38
451/222
3,834,255 A * 9/1974 Mulot ...................... B23G 1/04
82/110

(Continued)

FOREIGN PATENT DOCUMENTS

| JP | H-0788743 A | 4/1995 |
| JP | 2007319971 A | 12/2007 |
| JP | 2011-183481 A | 9/2011 |

OTHER PUBLICATIONS

Japanese Notice of Reasons for Refusal for Japanese Application No. 2017-249268, dated Nov. 26, 2019 with translation, 10 pages.

*Primary Examiner* — Ronald D Hartman, Jr.
(74) *Attorney, Agent, or Firm* — RatnerPrestia

(57) ABSTRACT

A numerical controller includes a motion start point determination unit that calculates a cycle motion start point where the screw thread cutting cycle is to be started, an acceleration/deceleration control unit that moves the tool from the cycle motion start point to a screw thread cutting start point with motions of a plurality of axes overlapped, and a control unit that controls motions of a machining device based on control instructions received from an instruction analysis unit and the acceleration/deceleration control unit. The cycle motion start point is a point from which acceleration or deceleration of a first axis and a second axis orthogonal to the first axis is started so as to make a speed of the first axis reach a specified cutting feed speed and to make a speed of the second axis substantially become zero at time of arrival at the screw thread cutting start point.

5 Claims, 7 Drawing Sheets

(51) Int. Cl.
*G05B 19/18* (2006.01)
*G05B 19/23* (2006.01)

(56) References Cited

U.S. PATENT DOCUMENTS

| | | | | |
|---|---|---|---|---|
| 4,419,912 A | * | 12/1983 | Sotome | B23B 29/125 |
| | | | | 82/11.1 |
| 4,944,639 A | * | 7/1990 | Washington | B23G 1/04 |
| | | | | 408/176 |
| 5,076,744 A | * | 12/1991 | Kitagawa | B23G 1/34 |
| | | | | 409/66 |
| 5,098,232 A | * | 3/1992 | Benson | B23B 27/007 |
| | | | | 407/33 |
| 5,429,459 A | * | 7/1995 | Palm | B23G 1/34 |
| | | | | 409/66 |
| 6,155,756 A | * | 12/2000 | Mericle | A61B 17/866 |
| | | | | 409/66 |
| 2005/0286984 A1 | * | 12/2005 | Weise | B23G 5/182 |
| | | | | 409/66 |
| 2007/0101787 A1 | * | 5/2007 | Fujiuchi | B23K 9/20 |
| | | | | 72/71 |
| 2011/0211925 A1 | * | 9/2011 | Liebald | B23G 1/18 |
| | | | | 409/66 |
| 2011/0218666 A1 | | 9/2011 | Sugie et al. | |
| 2018/0281090 A1 | * | 10/2018 | Watanabe | G05B 19/4093 |
| 2018/0318948 A1 | * | 11/2018 | Michiwaki | B23G 3/00 |
| 2019/0009352 A1 | * | 1/2019 | Iharada | B23G 5/18 |

* cited by examiner

NUMERICAL CONTROLLER

CROSS-REFERENCE TO RELATED APPLICATION

This application is a new U.S. Patent Application that claims benefit of Japanese Patent Application No. 2017-249268, filed Dec. 26, 2017 the disclosure of this application is being incorporated herein by reference in its entirety for all for all purposes.

BACKGROUND OF THE INVENTION

1. Field of the Invention

The present invention relates to a numerical controller and, particularly relates to a numerical controller that has an optimal approach function in a screw thread cutting cycle.

2. Description of the Related Art

Screw thread cutting refers to a technique for machining screw threads with a fixed pitch by a tool (feed axis) that moves in a direction of a rotation axis while synchronously following a rotating workpiece (spindle). FIG. 1 illustrates an example of a conventional screw thread cutting cycle for external threads. Dashed lines represent a rapid traverse and a solid line represents a cutting feed. In a process a, a tool moves from a screw thread cutting instruction start point to a screw thread cutting start point. In a process b, the tool starts the cutting feed from the screw thread cutting start point, reaches an end face of a workpiece, and machines the external threads on a surface of the workpiece. Upon an end of machining, the tool returns to the screw thread cutting instruction start point through processes c and d.

On condition that a distance between the screw thread cutting start point and the end face of the workpiece is too small in the process b, as illustrated in FIG. 2, the machining is started though the feed axis is still accelerating. As a result, the screw threads with a fixed pitch are not formed, so that an incomplete thread portion is produced. As illustrated in FIG. 3, conventionally, the screw thread cutting start point has been set so as to be comparatively distant from the end face so that the machining may be started after stabilization in a speed of the feed axis. This method, however, makes a problem in that cycle time is increased. It is desirable to attain an, optimal approach motion that may resolve such a problem.

In regard to this point, Japanese Patent Application Laid-Open No. 07-088743 discloses that a route to the screw thread cutting start point (cutting start point), an acceleration distance, and a feed speed are calculated and that the tool feed speed in an acceleration region is a resultant speed of a Z-axis direction speed and an X-axis direction speed. Japanese Patent Application Laid-Open No. 2011-183481 points out a problem in that time of a screw thread cutting cycle may be increased.

In a technique disclosed in Japanese Patent Application Laid-Open No. 07-088743, however, there is room for further optimization in the acceleration distance having a fixed value such as three or five pitches, a tool change position set at the screw thread cutting instruction start point (the tool change position does not have to be set at the screw thread cutting instruction start point in a second cycle and later), and the like. In Japanese Patent Application Laid-Open No. 2011-183481 that adopts a technique for reducing occurrence of the incomplete thread portion by synchronous control over rotation of a spindle and rotation of a feed axis, no specific reference is made to the acceleration distance, the screw thread cutting instruction start point, and the like.

SUMMARY OF THE INVENTION

The invention has been made in order to solve such problems. An object of the invention is to provide a numerical controller that has an optimal approach function in a screw thread cutting cycle.

A numerical controller according to an embodiment of the invention is a numerical controller that machines a workpiece by controlling a machining device including a tool based on a machining program and that carries out optimal approach of the tool in a screw thread cutting cycle. The numerical controller includes: an instruction analysis unit that analyzes the machining program; a cycle motion start point determination unit that calculates a cycle motion start point where a screw thread cutting cycle (including a rapid traverse of X axis and a cutting feed of Z axis) is to be started toward an end face of the workpiece; an acceleration/deceleration control unit that moves the tool from the cycle motion start point to the screw thread cutting start point with motions of a plurality of axes overlapped; and a control unit that controls motions of the machining device based on control instructions received from the instruction analysis unit and the acceleration/deceleration control unit. The numerical controller is characterized in that the cycle motion start point is a point from which acceleration or deceleration of a first axis parallel to a direction of the cutting feed and a second axis orthogonal to the first axis is started so as to make a speed of the first axis reach a specified cutting feed speed and to make a speed of the second axis substantially become zero at time of arrival at the screw thread cutting start point.

A numerical controller according to the embodiment of the invention is characterized in that the cycle motion start point determination unit calculates coordinates of the cycle motion start point based on coordinates of the screw thread cutting start point, a speed of the cutting feed, a speed of the rapid traverse, and time constants for X axis and Z axis.

A numerical controller according to the embodiment of the invention is characterized in that the cycle motion start point determination unit calculates displacement between the screw thread cutting start point and the cycle motion start point in accordance with expressions 1 to 4 that will be described later.

A numerical controller according to the embodiment of the invention is characterized in that the acceleration/deceleration control unit controls movement of the tool from the cycle motion start point calculated by the cycle motion start point determination unit to the screw thread cutting start point, from the screw thread cutting start point to a machining end point, and from the machining end point to the cycle motion start point, starts the acceleration or deceleration of the first axis parallel to the direction of the cutting feed and the second axis orthogonal to the first axis from the cycle motion start point, makes the speed of the first axis reach the specified cutting feed speed and makes the speed of the second axis become zero at the time of the arrival at the screw thread cutting start point, carries out the cutting feed along the first axis from the screw thread cutting start point, and carries out the rapid traverse toward the cycle motion start point from a point slightly shifted along the second axis from a point where the cutting feed is ended.

A numerical controller according to the embodiment of the invention is a numerical controller that machines a workpiece by controlling a machining device including a tool based on a machining program and that carries out optimal approach in a machining cycle. The numerical controller includes: an instruction analysis unit that analyzes the machining program; a cycle motion start point determination unit that calculates a cycle motion start point where a screw thread cutting cycle (including a rapid traverse of X axis and a cutting feed of Z axis) is to be started toward an end face of the workpiece; an acceleration/deceleration control unit that moves the tool from the cycle motion start point to the screw thread cutting start point with motions of a plurality of axes overlapped; and a control unit that controls motions of the machining device based on control instructions received from the instruction analysis unit and the acceleration/deceleration control unit. The numerical controller is characterized in that the cycle motion start point is a point from which acceleration or deceleration of a first axis parallel to a direction of the cutting feed and a second axis orthogonal to the first axis is started so as to make a speed of the first axis reach a specified cutting feed speed and to make a speed of the second axis substantially become zero at time of arrival at the screw thread cutting start point.

According to the invention, the numerical controller that has the optimal approach function in the screw thread cutting cycle may be provided.

BRIEF DESCRIPTION OF THE DRAWINGS

The above-mentioned and other objects and features of the invention will become apparent from the following description of the embodiment with reference to the accompanying drawings, in which.

DETAILED DESCRIPTION OF THE PREFERRED EMBODIMENT

Figure 1:
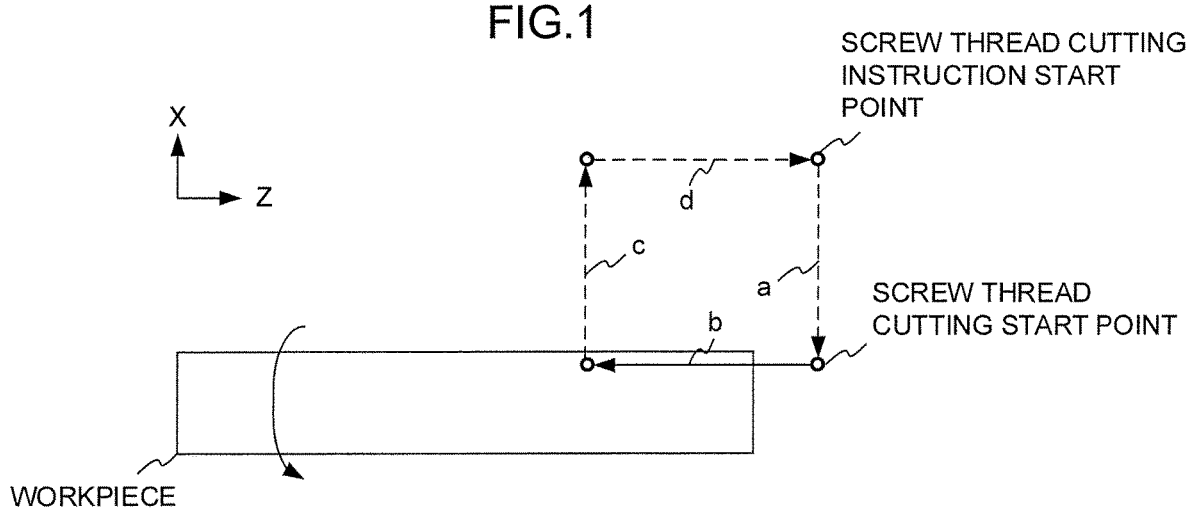
FIG. 1 is a diagram illustrating an example of a conventional screw thread cutting cycle.
Figure 2:
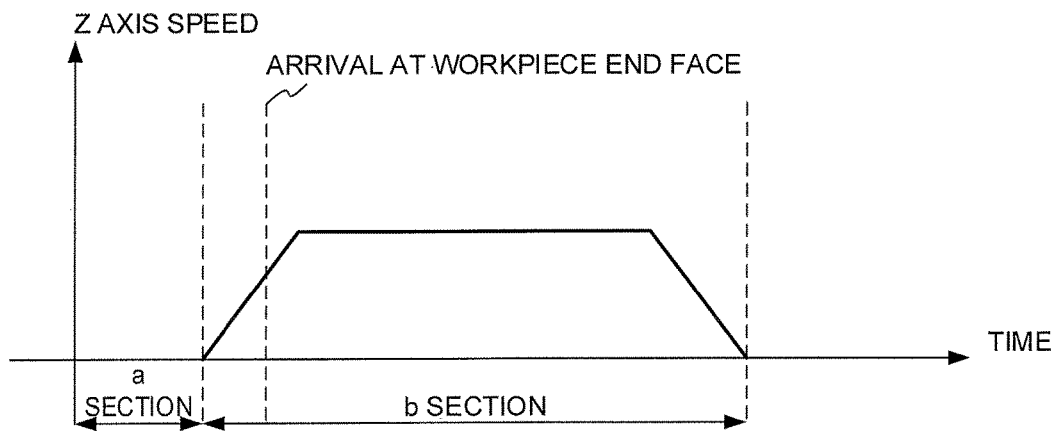
FIG. 2 is a diagram illustrating an example of a conventional screw thread cutting cycle.
Figure 3:
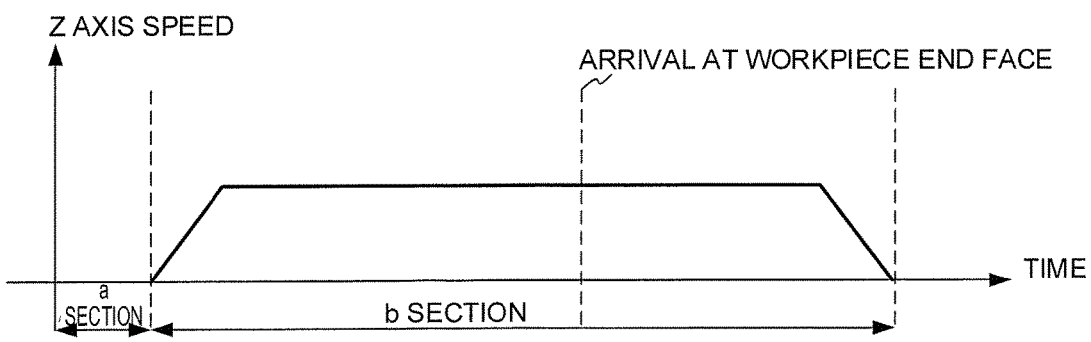
FIG. 3 is a diagram illustrating an example of a conventional screw thread cutting cycle.
Figure 4:
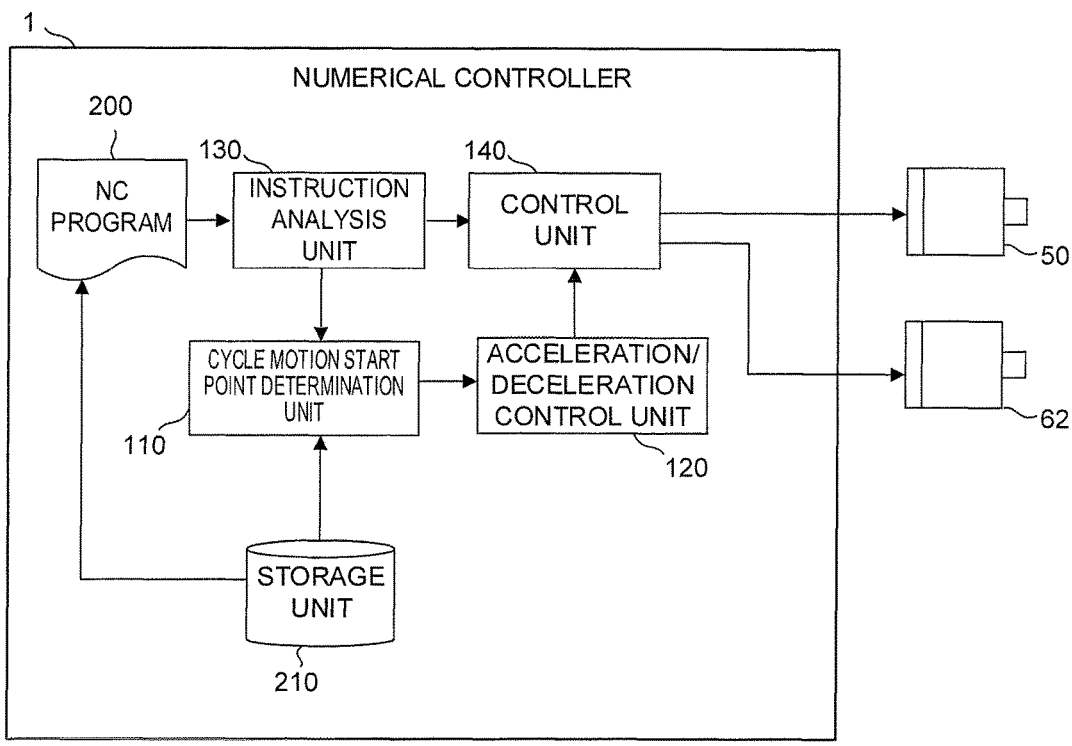
FIG. 4 is a diagram illustrating a configuration of a numerical controller according to the invention.

A numerical controller 1 according to an embodiment of the invention will be described with use of the drawings. FIG. 4 is a block diagram illustrating a functional configuration of the numerical controller 1. The numerical controller 1 includes a cycle motion start point determination unit 110, an acceleration/deceleration control unit 120, an instruction analysis unit 130, and a control unit 140 as functions for controlling motions of a feed axis of a machining device to be controlled.

Figure 5:
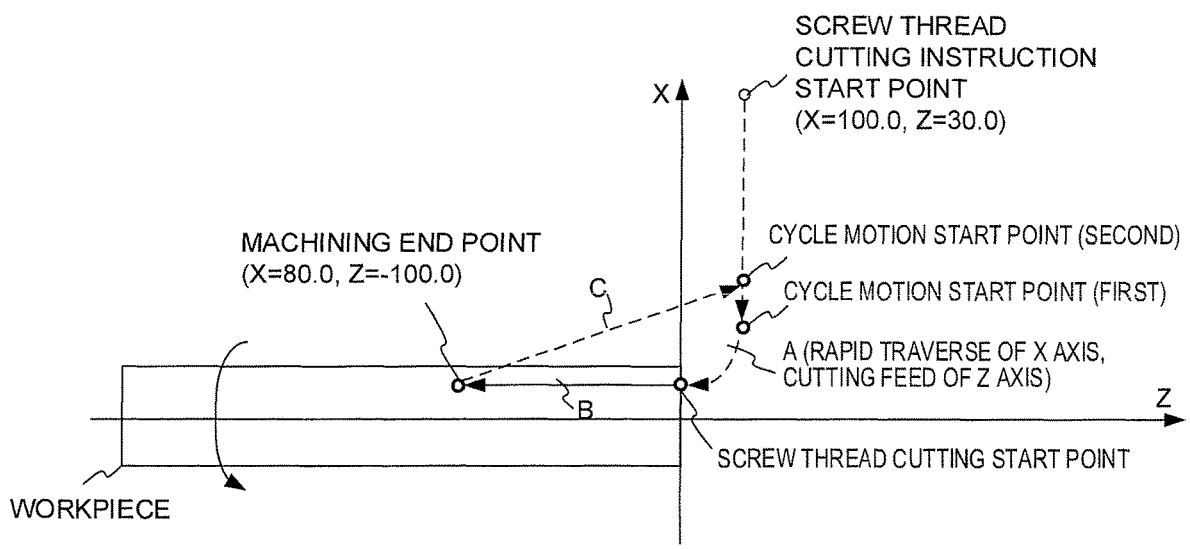
FIG. 5 is a diagram illustrating a motion that is caused by the numerical controller.
Figure 6:
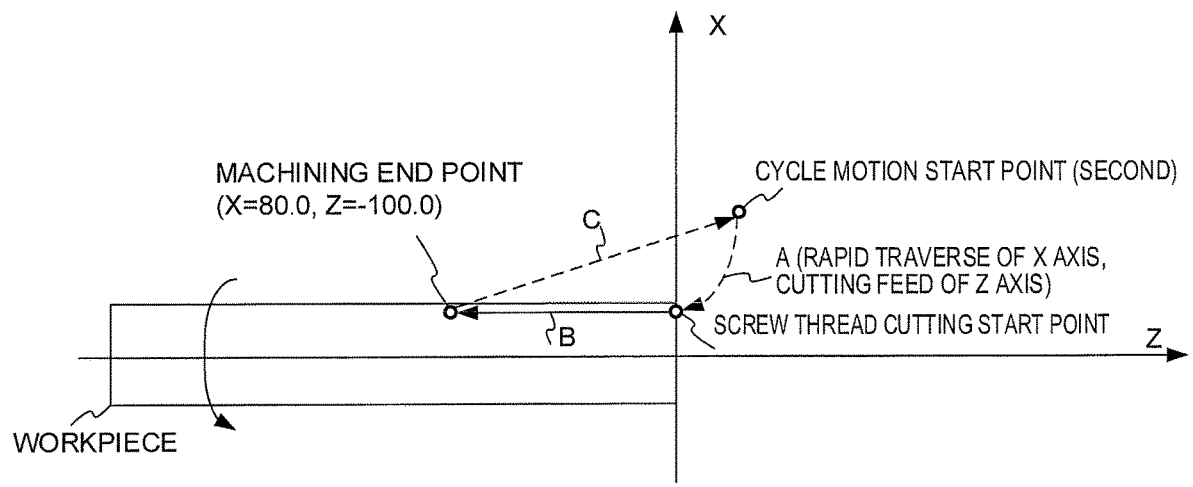
FIG. 6 is a diagram illustrating a motion that is caused by the numerical controller.

The numerical controller 1 attains an economical and optimal approach motion through actions of the cycle motion start point determination unit 110 and the acceleration/deceleration control unit 120. An example of specific movement that is caused by the numerical controller 1 is illustrated with use of FIGS. 5 and 6. FIGS. 5 and 6 illustrate movement of a tool in screw thread cutting in accordance with a machining program that will be described below. FIG. 5 illustrates a screw thread cutting cycle motion in the first cycle of a screw thread cutting cycle and FIG. 6 illustrates a screw thread cutting cycle motion in the second cycle of a screw thread cutting cycle and later. G92 denotes a screw thread cutting cycle instruction.

O0001;
G28 U0 W0;
N001 M03 S50 P1;
N002 X100.0 Z30.0;
N003 G92 X80.0 Z-100.0 F20.0;
M30;

The numerical controller 1 starts movement of X axis from the screw thread cutting instruction start point (process E), starts movement of Z axis from a cycle motion start point calculated by the cycle motion start point determination unit 110 (process A), and exerts control so as to attain completion of the movement of X axis and a speed of Z axis equal to a cutting feed speed on an instruction at time of arrival at the screw thread cutting start point. That is, acceleration/deceleration control is exerted so that the approach may be attained with motions of X axis and Z axis overlapped and so that the speed of the feed axis may be just stabilized, that is, made constant at the screw thread cutting start point. Thus a distance between the cycle motion start point and the screw thread cutting start point may be optimized, so that cycle time may be shortened. After that, the screw thread cutting is carried out with a cutting feed at the constant speed (process B). After an end of machining, the movement from a machining end point (X=80.0, Z=-100.0) toward the cycle motion start point is attained in a shortest distance (process C) and the movement to a cycle motion start point in a subsequent cycle is thereafter attained. In terms of machining quality, a slight escape may be made in a substantially positive direction along X axis from the machining end point and then the movement from an escape point toward the cycle motion start point may be attained in a shortest distance. The movement to the subsequent cycle motion start point may be attained after the end of machining.

The above motions will be described in more detail with use of FIGS. 7 to 12.

Figure 7:
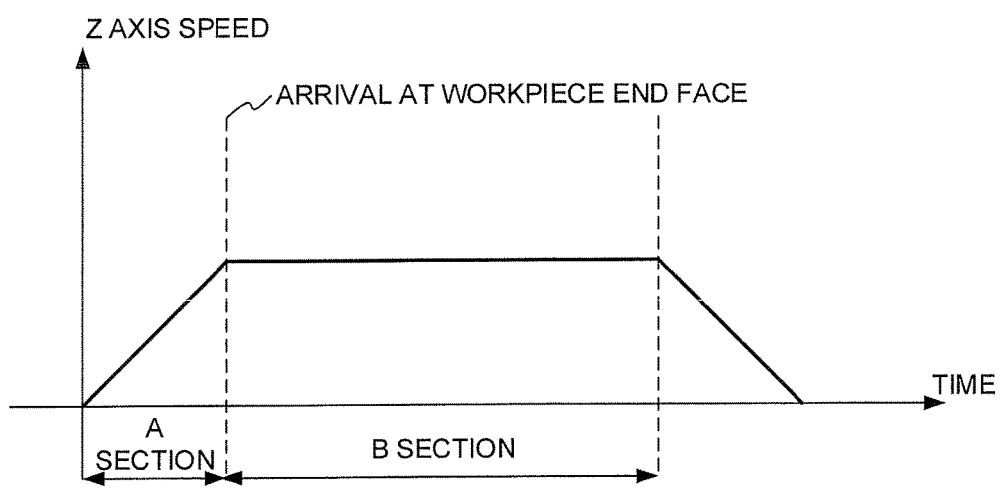
FIG. 7 is a diagram illustrating a motion that is caused by the numerical controller.
Figure 8:
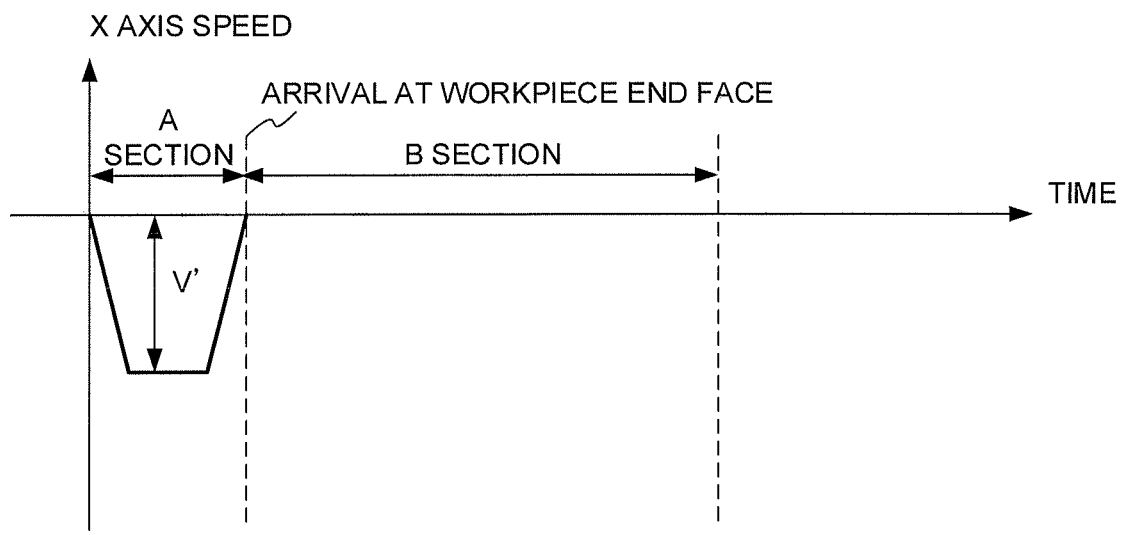
FIG. 8 is a diagram illustrating a motion that is caused by the numerical controller.
Figure 9:
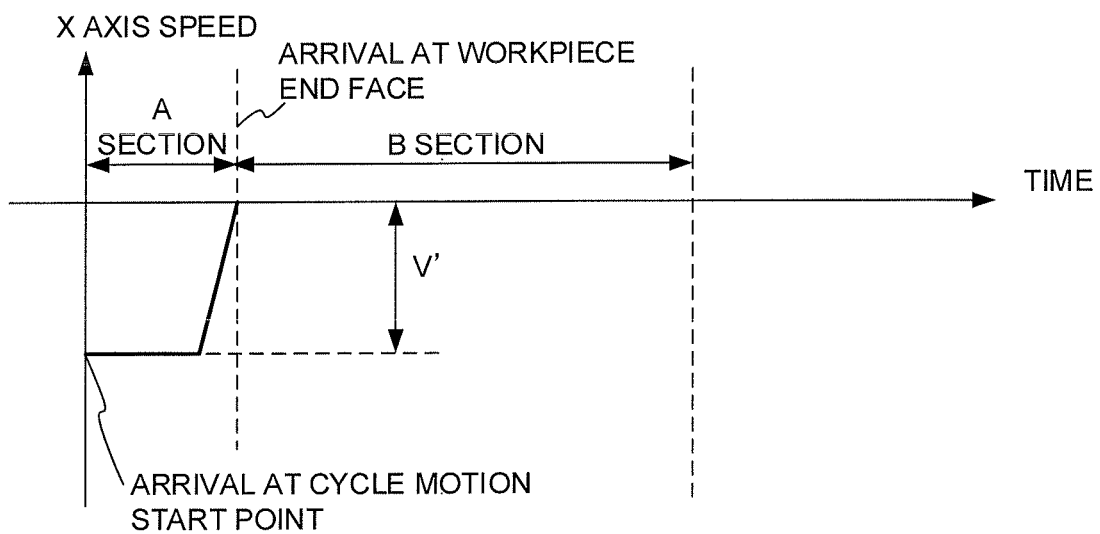
FIG. 9 is a diagram illustrating a motion that is caused by the numerical controller.

FIGS. 7 to 9 are diagrams illustrating a method by which the cycle motion start point determination unit 110 determines the cycle motion start point. In the process A, X axis moves from the screw thread cutting instruction start point in the first screw thread cutting cycle. After completion of the first screw thread cutting cycle motion, the tool moves to the cycle motion start point and therefore X axis moves from the cycle motion start point in the second screw thread cutting cycle and later. As illustrated in FIG. 7, Z axis starts the motion from a position that is distant from the screw thread cutting start point by a distance required for attainment of the feed speed for the cutting feed (which will be referred to as an acceleration distance, hereinbelow). In the first screw thread cutting cycle, as illustrated in FIG. 9, X axis accelerates from the screw thread cutting instruction start point and thereafter decelerates to a speed of zero before arrival at the end face of the workpiece. In the second screw thread cutting cycle and later, as illustrated in FIG. 8, X axis accelerates from the cycle motion start point and thereafter decelerates to the speed of zero. Thus occurrence of an incomplete thread portion may be avoided and the machining may be started in shortest possible time.

The cycle motion start point determination unit 110 calculates the acceleration distance δ of Z axis that satisfies such conditions as described above, in accordance with following expression 1.

$$\delta = \frac{VT_C}{2}.$$ [Expression 1]

Here, V represents the feed speed for the screw thread cutting (cutting feed) and $T_C$ represents the time constant for Z axis.

The cycle motion start point determination unit 110 may calculate the motion start point in accordance with expressions 2 to 4 below.

$$X_1' = \begin{cases} V'\left(T_C - \frac{T_R}{2}\right) & (T_C \geq T_R) \\ \frac{aT_C^2}{2} & (T_C \leq T_R) \end{cases}$$ [Expression 2]

$$X_2' = \begin{cases} V'(T_C - T_R) & (T_C \geq T_R) \\ \frac{aT_C^2}{4} & (T_C < T_R) \end{cases}$$ [Expression 3]

$$Z' = \delta$$ [Expression 4]

Here, V' represents a rapid traverse speed of X axis, $T_R$ represents the time constant in X axis direction, and a represents an acceleration in X axis direction. $X_1'$, $X_2'$, and Z' respectively represent displacement in X axis direction and in Z axis direction from the screw thread cutting start point. In other words, $X_1'$ represents a rapid traverse distance in X axis direction in the first screw thread cutting cycle, $X_2'$ represents a rapid traverse distance in X axis direction in the second screw thread cutting cycle and later, and Z' represents the distance required for the attainment of the feed speed for the screw thread cutting (cutting feed) in Z axis direction on the instruction, that is, the acceleration distance.

Figure 11:
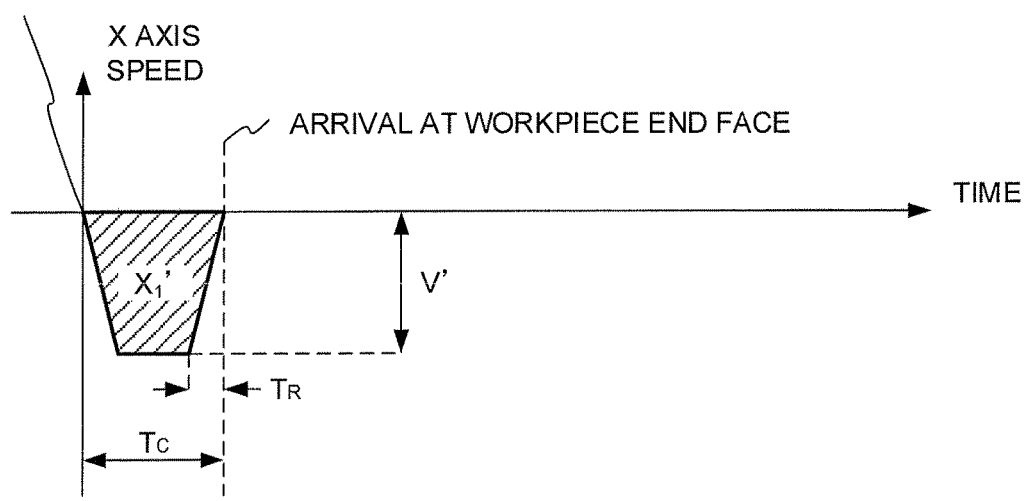
FIG. 11 is a diagram illustrating a motion that is caused by the numerical controller.
Figure 12:
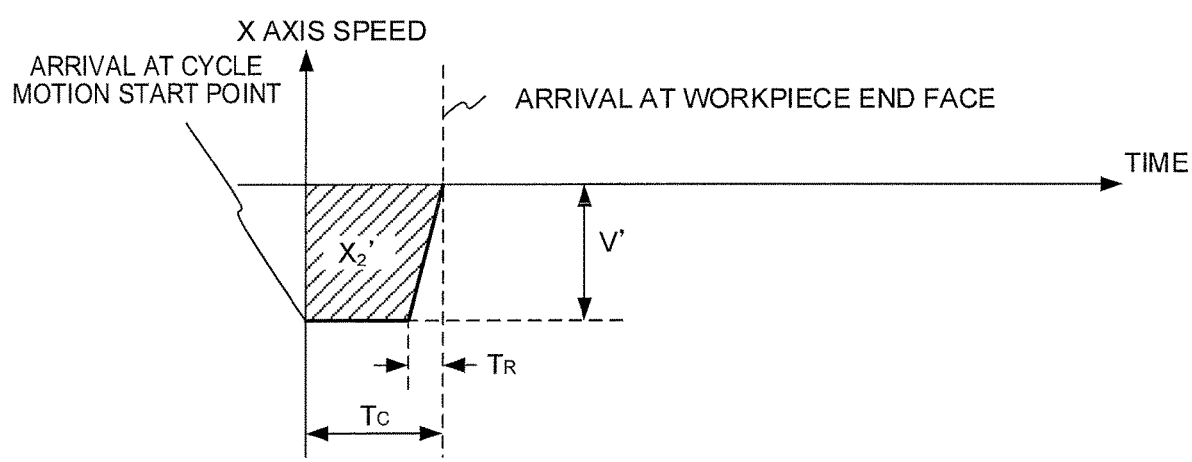
FIG. 12 is a diagram illustrating a motion that is caused by the numerical controller.

In the first screw thread cutting cycle, a relation $T_C \geq T_R$ represents a condition in which the rapid traverse speed of X axis decelerates after reaching a maximum speed (constant speed) as illustrated in FIG. 12. By contrast, a relation $T_C < T_R$ represents a condition in which Z axis accelerates before X axis decelerates. In the second screw thread cutting cycle and later, a relation $T_C \geq 2T_R$ represents a condition in which the rapid traverse speed of X axis decelerates after reaching the maximum speed (constant speed) as illustrated in FIG. 11. By contrast, a relation $T_C < 2T_R$ represents a condition in which the rapid traverse speed of X axis starts to decelerate before reaching the constant speed. In the embodiment, it is assumed that a feedforward coefficient is 100% and that there is no delay in a servo system.

Figure 10:
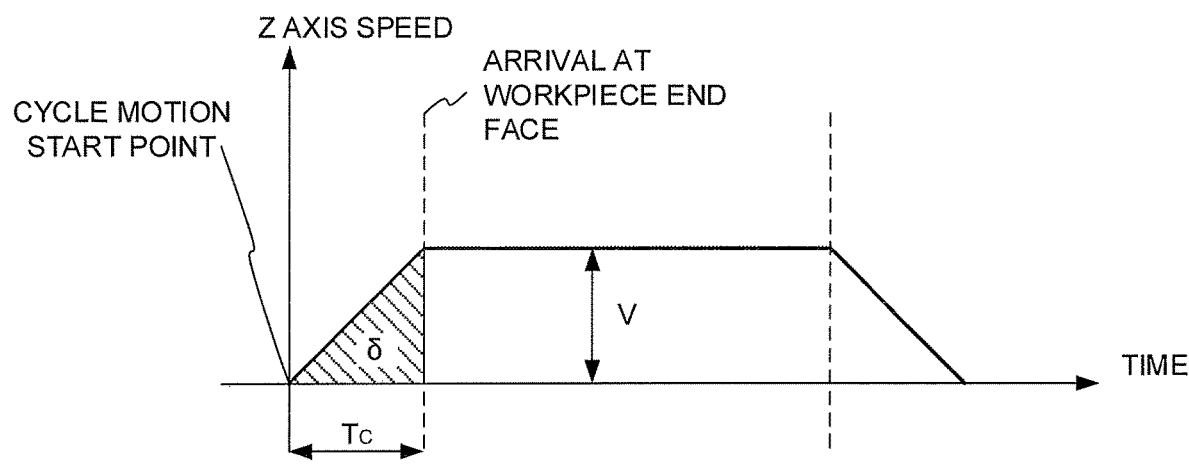
FIG. 10 is a diagram illustrating a motion that is caused by the numerical controller.

In FIGS. 10 to 12, relationships among $T_C$, $T_R$, δ, X', V, and V' are illustrated as velocity waveforms.

The instruction analysis unit 130 sequentially reads out and analyzes a machining program 200 that is stored in a storage unit 210 and that is to be executed, analyzes information such as the cutting start point and a cutting end point of the screw thread cutting cycle on instructions and a lead of a screw, and outputs information produced based on a result of analysis to the cycle motion start point determination unit 110 and the control unit 140.

The cycle motion start point determination unit 110 calculates the cycle motion start point based on the information such as the cutting start point and the cutting end point produced based on the result of the analysis by the instruction analysis unit 130 and coordinates of the end face of the workpiece and the time constants for X axis and Z axis that are stored in the storage unit 210 and outputs a result to the acceleration/deceleration control unit 120.

In the process A, the acceleration/deceleration control unit 120 controls the movement of the tool from the cycle motion start point calculated by the cycle motion start point determination unit 110 to the screw thread cutting start point. In Z axis direction, the acceleration/deceleration control unit 120 carries out acceleration to the speed V in accordance with the time constant $T_C$. In regard to X axis, in the first screw thread cutting cycle, acceleration to the speed V' in accordance with the time constant $T_R$ is carried out and thereafter deceleration to the speed of zero in accordance with the time constant $T_R$ is carried out at time when a coordinate value of X axis reaches $X_1'$. In the second screw thread cutting cycle and later, the acceleration to the speed V' in accordance with the time constant $T_R$ is carried out in the screw thread cutting cycle and thereafter the deceleration to the speed of zero in accordance with the time constant $T_R$ is carried out at time when the coordinate value of X axis reaches $X_2'$.

In the process B, the acceleration/deceleration control unit 120 carries out the cutting feed at the speed V, deceleration, and a stoppage at the machining end point. In the process C, the movement is carried out in the shortest distance from the machining end point toward the cycle motion start point, that is, in a linear manner and with the rapid traverse as illustrated in FIGS. 5 and 6. Alternatively, a slight escape may be made in the substantially positive direction along X axis from the machining end point and then the movement from the escape point toward the cycle motion start point may be carried out in the shortest distance.

The control unit 140 controls operations of a servo motor 50 and a spindle motor 62 that are included in the machining device, based on control instructions received from the instruction analysis unit 130 and the acceleration/deceleration control unit 120.

According to the embodiment, the numerical controller 1 may attain an optimal tool path in a screw thread cutting cycle. More specifically, coordinates of the cycle motion start point may be automatically identified based on the coordinates of the end face (screw thread cutting start point) of the workpiece, the rapid traverse speed, a cutting feed speed, and the time constants for X axis and Z axis. Thus the cycle time for screw thread cutting machining may be shortened. Besides, production of the machining program is facilitated. For an existing program as well, a positioning point may be automatically converted by application of the embodiment and thus improvement in the cycle time is expected.

Figure 13:
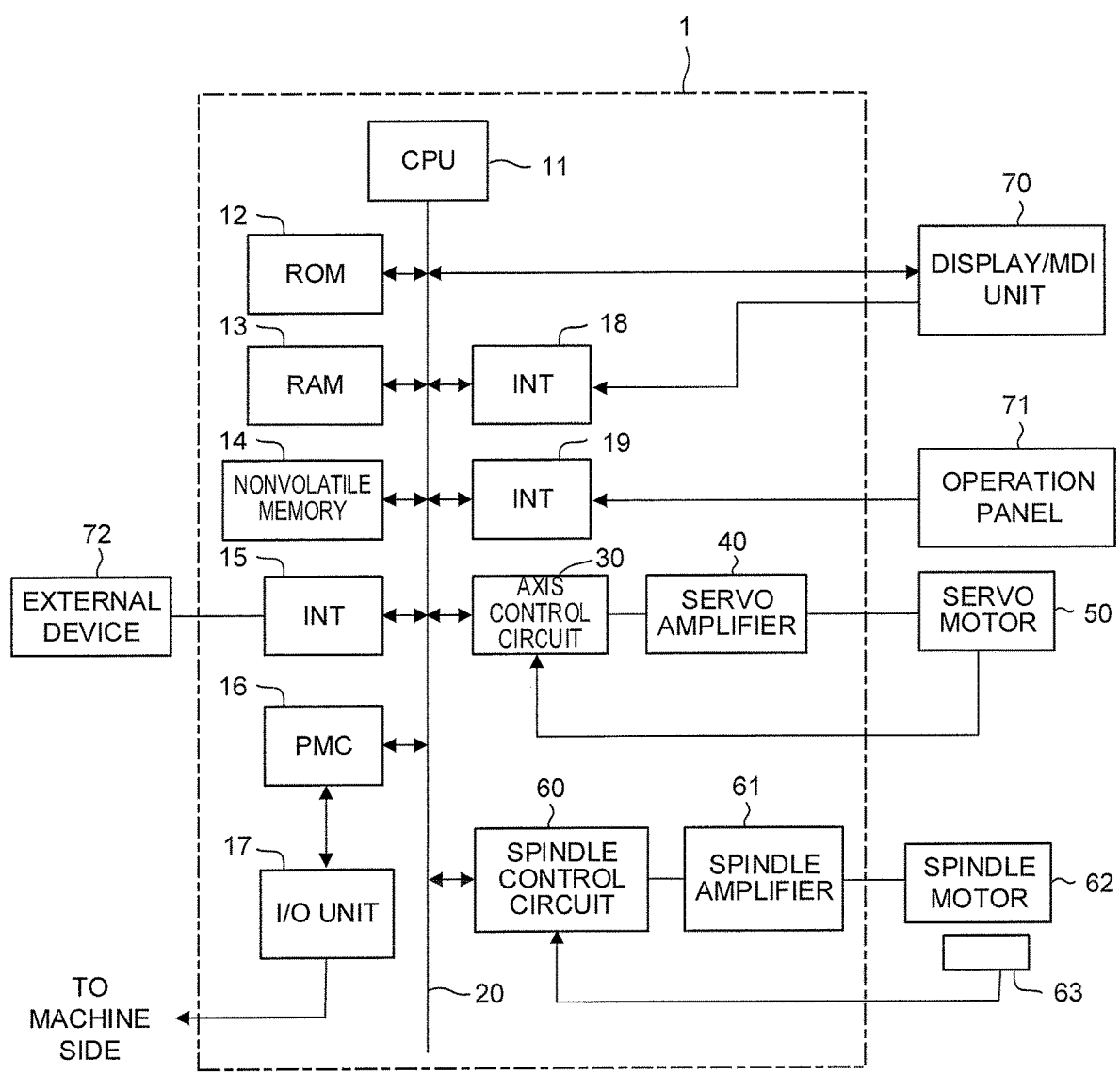
FIG. 13 is a diagram illustrating a hardware configuration of the numerical controller according to the invention.

FIG. 13 is a schematic hardware configuration illustrating major portions of the numerical controller 1 according to the embodiment of the invention and the machining device that is driven and controlled by the numerical controller 1. Each functional block of the numerical controller 1 illustrated in FIG. 4 is implemented by execution of a system program for controlling the machining device and control over operations of the units of the numerical controller 1 by a CPU 11 included in the numerical controller 1 illustrated in FIG. 13.

The CPU 11 included in the numerical controller 1 according to the embodiment is a processor that generally controls the numerical controller 1. The CPU 11 reads out the system program stored in a ROM 12 via a bus 20 and controls the whole numerical controller 1 in accordance with the system program. Temporary calculation data and display data, various types of data inputted by an operator through a display/MDI unit 70 that will be described later, and the like are stored in a RAM 13.

A nonvolatile memory 14 is configured as a memory that is backed up by a battery not illustrated, for instance, so that storage status is held even when the numerical controller 1 is powered off. NC programs read in through an interface 15, NC programs inputted through the display/MDI unit 70 that will be described later, data including machining conditions, and the like are stored in the nonvolatile memory 14. The programs and the like stored in the nonvolatile memory 14 may be expanded in the RAM 13 when being used. Various system programs for carrying out processing in an edit mode required for preparation and editing of the NC programs and other required processing have been written in advance into the ROM 12.

The interface 15 is an interface for connection between the numerical controller 1 and an external device 72 such as an adapter. From a side of the external device 72, the NC programs, various parameters, and the like are read in. The NC programs edited in the numerical controller 1 may be stored in an external storage through the external device 72. A programmable machine controller (PMC) 16 outputs signals to and exerts control over peripheral devices (actuators such as a robot hand for changing the tool, for instance) for the machining device through an I/O unit 17 in pursuance of a sequence program stored in the numerical controller 1. Besides, the PMC 16 receives signals from various switches in an operation panel provided on a main unit of the machining device, or the like, carries out necessary signal processing, and thereafter transfers the signals to the CPU 11.

The display/MDI unit 70 is a manual data input device including a display, a key board, and the like. An interface 18 receives instructions, data, and the like from the keyboard of the display/MDI unit 70 and transfers the instructions, the data, and the like to the CPU 11. An interface 19 is connected to the operation panel 71 that includes a manual pulse generator for use in manual driving of the axes or the like.

Axis control circuits 30 for control over the axes provided in the machining device receive travel distance instructions for the axes from the CPU 11 and output instructions for the axes to servo amplifiers 40. The servo amplifiers 40 receive the instructions and drive servo motors 50 that move the axes provided in the machining device. The servo motors 50 for the axes house position/speed detectors, feed back position/speed feedback signals from the position/speed detectors to the axis control circuits 30, and carry out feedback control over the positions/speeds. Though the axis control circuits 30, the servo amplifiers 40, and the servo motors 50 are illustrated in a hardware configuration of FIG. 13 so as to respectively number in only one, the axis control circuits 30, the servo amplifiers 40, and the servo motors 50 are actually provided so as to respectively number in a number of feed axes provided in machining devices in systems to be controlled.

A spindle control circuit 60 receives a spindle rotation instruction for a manufacturing machine and outputs a spindle speed signal to a spindle amplifier 61. The spindle amplifier 61 receives the spindle speed signal, rotates the spindle motor 62 of the manufacturing machine at a rotation speed on the instruction, and thereby drives the tool. A position coder 63 is coupled to the spindle motor 62 and outputs return pulses in synchronization with rotation of the spindle. The return pulses are read by the CPU 11.

Though the embodiment of the invention has been described above, the invention is not limited to the embodiment or examples described above and may be embodied in various manners with appropriate modification. For instance, though the example of the machining of the external threads has been mainly adduced for the embodiment described above, the invention is not limited to the example and may be applied to machining of internal threads, for instance.

The invention claimed is:

1. A numerical controller that machines a workpiece by controlling a machining device including a tool based on a machining program and that carries out optimal approach of the tool in a screw thread cutting cycle, the numerical controller comprising:
an instruction analysis unit that analyzes the machining program;
a cycle motion start point determination unit that calculates a cycle motion start point where a screw thread cutting cycle, including a rapid traverse of X axis and a cutting feed of Z axis, is to be started toward an end face of the workpiece;
an acceleration/deceleration control unit that moves the tool from the cycle motion start point to the screw thread cutting start point with motions of a plurality of axes overlapped; and
a control unit that controls motions of the machining device based on control instructions received from the instruction analysis unit and the acceleration/deceleration control unit, wherein
the cycle motion start point is a point from which acceleration or deceleration of a first axis parallel to a direction of the cutting feed and a second axis orthogonal to the first axis is started so as to make a speed of the first axis reach a specified cutting feed speed and to make a speed of the second axis substantially become zero at time of arrival at the screw thread cutting start point.

2. The numerical controller according to claim 1, wherein the cycle motion start point determination unit calculates coordinates of the cycle motion start point based on coordinates of the screw thread cutting start point, a speed of the rapid traverse, a speed of the cutting feed, and time constants for the X axis and the Z axis.

3. The numerical controller according to claim 2, wherein the cycle motion start point determination unit calculates displacement between the screw thread cutting start point and the cycle motion start point in accordance with following expressions 1 to 4:

$$\delta = \frac{VT_C}{2} \qquad \text{[Expression 1]}$$

$$X'_1 = \begin{cases} V'\left(T_C - \dfrac{T_R}{2}\right) & (T_C \geq T_R) \\ \dfrac{aT_C^2}{2} & (T_C \leq T_R) \end{cases} \qquad \text{[Expression 2]}$$

$$X_2' = \begin{cases} V'(T_C - T_R) & (T_C \geq 2T_R) \\ \dfrac{aT_C^2}{4} & (T_C < 2T_R) \end{cases} \quad \text{[Expression 3]}$$

$$Z' = \delta \quad \text{[Expression 4]}$$

where Z' represents the displacement of the first axis, $X_1'$ represents the displacement of the second axis in a first screw thread cutting cycle, $X_2'$ represents the displacement of the second axis in a second screw thread cutting cycle and later, V represents the speed of the cutting feed, $T_C$ represents the time constant for the Z axis, $T_R$ represents the time constant in X axis direction, and a represents an acceleration in the X axis direction.

4. The numerical controller according to claim 1, wherein the acceleration/deceleration control unit controls movement of the tool from the cycle motion start point calculated by the cycle motion start point determination unit to the screw thread cutting start point, from the screw thread cutting start point to a machining end point, and from the machining end point to the cycle motion start point, starts the acceleration or deceleration of the first axis parallel to the direction of the cutting feed and the second axis orthogonal to the first axis from the cycle motion start point, makes the speed of the first axis reach the specified cutting feed speed and makes the speed of the second axis become zero at the time of the arrival at the screw thread cutting start point, carries out the cutting feed along the first axis from the screw thread cutting start point, and carries out the rapid traverse toward the cycle motion start point from a point slightly shifted along the second axis from a point where the cutting feed is ended.

5. A numerical controller that machines a workpiece by controlling a machining device including a tool based on a machining program and that carries out optimal approach in a machining cycle, the numerical controller comprising:
an instruction analysis unit that analyzes the machining program;
a cycle motion start point determination unit that calculates a cycle motion start point where a screw thread cutting cycle, including a rapid traverse of X axis and a cutting feed of Z axis, is to be started toward an end face of the workpiece;
an acceleration/deceleration control unit that moves the tool from the cycle motion start point to the screw thread cutting start point with motions of a plurality of axes overlapped; and
a control unit that controls motions of the machining device based on control instructions received from the instruction analysis unit and the acceleration/deceleration control unit, wherein the cycle motion start point is a point from which acceleration or deceleration of a first axis parallel to a direction of the cutting feed and a second axis orthogonal to the first axis is started so as to make a speed of the first axis reach a specified cutting feed speed and to make a speed of the second axis substantially become zero at time of arrival at the screw thread cutting start point.

* * * * *